United States Patent
Goldstein

Patent Number: 5,793,295
Date of Patent: Aug. 11, 1998

[54] DETECTION APPARATUS AND METHOD

[75] Inventor: Mark K. Goldstein, Del Mar, Calif.

[73] Assignee: Quantum Group, Inc. San Diego, Calif.

[21] Appl. No.: 595,495

[22] Filed: Feb. 1, 1996

Related U.S. Application Data

[63] Continuation-in-part of Ser. No. 283,550, Aug. 1, 1994, Pat. No. 5,596,314.

[51] Int. Cl.⁶ ........................................ G08B 17/10
[52] U.S. Cl. ................ 340/632; 340/628; 340/630; 429/96; 429/97; 429/98
[58] Field of Search ........................ 340/628, 630, 340/632, 633, 634, 635, 693; 220/521, 522, 254, 293; 429/96, 97, 98, 99, 100

[56] References Cited

U.S. PATENT DOCUMENTS

| | | | |
|---|---|---|---|
| Re. 30,323 | 7/1980 | Tomioka | 250/385 |
| 2,549,974 | 4/1951 | Klug | 23/255 |
| 2,553,179 | 5/1951 | Farr | 23/255 |
| 3,027,552 | 3/1962 | Landis | 340/237 |
| 3,882,477 | 5/1975 | Mueller | 340/510 |
| 4,043,934 | 8/1977 | Schuler et al. | 436/134 X |
| 4,090,177 | 5/1978 | Urata et al. | 340/630 X |
| 4,144,032 | 3/1979 | Davis | 436/168 X |
| 4,152,551 | 5/1979 | Hiller | 179/107 |
| 4,181,439 | 1/1980 | Tresch et al. | 340/630 X |
| 4,228,428 | 10/1980 | Niedermeyer | 340/628 |
| 4,316,184 | 2/1982 | Nagel | 340/630 X |
| 4,319,234 | 3/1982 | Rice | 340/628 |
| 4,401,978 | 8/1983 | Soloman | 340/630 X |
| 4,539,556 | 9/1985 | Dederich et al. | 340/630 |
| 4,688,021 | 8/1987 | Buck et al. | 340/632 |
| 4,769,550 | 9/1988 | Dolnick | 250/574 |
| 4,839,014 | 6/1989 | Park et al. | 204/265 |
| 4,845,474 | 7/1989 | Moore et al. | 340/629 |
| 4,870,395 | 9/1989 | Belano | 340/693 |
| 4,959,640 | 9/1990 | Hall | 340/693 |
| 5,063,164 | 11/1991 | Goldstein | 436/169 |
| 5,103,216 | 4/1992 | Sisselman | 340/693 |
| 5,172,042 | 12/1992 | Singhal | 320/2 |
| 5,208,116 | 5/1993 | Joh | 429/96 |
| 5,280,273 | 1/1994 | Goldstein | 340/632 |
| 5,290,639 | 3/1994 | Mallory | 429/1 |
| 5,302,350 | 4/1994 | Goswami et al. | 422/86 |
| 5,327,119 | 7/1994 | Ishii | 340/629 |
| 5,346,671 | 9/1994 | Goswami et al. | 422/86 |
| 5,367,575 | 11/1994 | Dieken et al. | 381/67 |
| 5,394,094 | 2/1995 | Wagner | 324/556 |
| 5,396,221 | 3/1995 | Bridges | 340/628 |
| 5,405,583 | 4/1995 | Goswami et al. | 422/86 |
| 5,445,900 | 8/1995 | Miller Jr. | 429/1 |
| 5,521,022 | 5/1996 | Petzl | 429/97 |
| 5,592,147 | 1/1997 | Wong | 340/632 |
| 5,596,314 | 1/1997 | Goldstein | 340/632 |

FOREIGN PATENT DOCUMENTS

| | | | |
|---|---|---|---|
| 39761 | 11/1981 | European Pat. Off. | 340/630 |
| 2241985 | 9/1991 | United Kingdom | 17/10 |

OTHER PUBLICATIONS

Drager: Detector tube handbook 4th Edition 1979 pp. 30, 82.
ESP-Alert Carbon Monoxide/Smoke detector.
COSTAR (TM) Carbon Monoxide Alarm, Quantum Group Inc.,.

*Primary Examiner*—Jeffery A. Hofsass
*Assistant Examiner*—Ashok Mannava
*Attorney, Agent, or Firm*—Niro, Scavone, Haller & Niro

[57] ABSTRACT

A detector sensor system for sensing the presence of a toxic gas, such as carbon monoxide and/or smoke whereby a corresponding alarm is sounded. The presence of the gas is detected by passing light through a biomimetic sensing material in which the optical characteristics change in the presence of the target gas. This system includes a housing containing a light emitter, light detector and a mechanism for sounding an alarm. The sensing material is contained in a cell which, together with a battery to power the system, is mounted in a key insertable into the housing. The key may be readily inserted or withdrawn from the housing for replacement purposes. When fully inserted, the key positions the sensing cell means between the light emitter and detector means and brings the battery contacts carried therewith into connection with contacts associated with the system circuitry mounted within the housing.

23 Claims, 3 Drawing Sheets

DETECTION APPARATUS AND METHOD

CROSS REFERENCE TO RELATED APPLICATION

This application is a continuation in part of U.S. application patent Ser. No. 08/283,550, filed Aug. 1, 1994, now U.S. Pat. No. 5,596,314. All the disclosure of copending application 08/283,550 is incorporated herein by reference.

BACKGROUND

The invention relates to gas detection systems such as carbon monoxide detectors mounted on walls or ceilings in residential applications.

Airborne gases and vapors which are hazardous or otherwise dangerous, such as propane, methane, carbon monoxide, mercury vapor, ethylene oxide, hydrogen sulfide, and other hazardous gases, are sometimes difficult to detect, especially where they are odorless or present at levels that cannot be smelled, or are masked by other odors. The danger of these hazardous gases is becoming increasingly apparent, especially in industrial plants, mines, environmentally sealed homes and office buildings, recreational and other vehicles and other environments in which people are present for long periods of time.

A solid-state biomimetic sensor has been developed which has an extended lifetime and which mimics the human response to various toxic gases and vapors. As disclosed by Goldstein in U.S. Pat. No. 5,063,164, the contents of which are hereby incorporated by reference, a biomimetic sensor comprises a porous, semitransparent substrate impregnated with a self-regenerating chemical sensing reagent. The presence of target gases is determined by measuring the change in optical density of the sensor when exposed to the target gas. The sensor has a relatively long, useful lifetime, typically greater than three years.

Other gas sensing compositions have been disclosed in several issued U.S. Patents such as Ser. No.: 4,043,934, 5,302,350, 5,346,671, 5,405,583. Generally the disclosed sensors are useful for detecting certain gases, such as reducing gases like carbon monoxide, by producing a color change upon exposure to an atmosphere containing the target hazardous gas.

A gas detector system which uses the above described Goldstein biomimetic sensor has been disclosed in U.S. Pat. No. 5,280,273. The gas detector system includes a housing containing a light emitter, a light detector and a mechanism for sounding an alarm. The target gas sensor is contained in a battery/sensor cell, which also comprises a battery to power the system. The cell is inserted into a drawer which when so combined is slid into the housing for the system. The system housing has openings in it thereby permitting ambient air to reach the sensor and sound generated by the alarm to escape. When fully inserted, the drawer positions the gas sensor between a light emitter and a light detector and simultaneously brings the battery into electrical connection with contacts for the alarm and light system. The drawer is configured so that it cannot be inserted without a battery/sensor cell in place. As a separate unit the battery/sensor cell sub-combination may be replaceably inserted within the drawer.

Although the above described '273 configuration has had significant market success, replacement of the battery/sensor sub-combination may be difficult in a relative sense for the elderly or persons with a disability. For example, the sub-combination package may be grasped at only limited locations for removal from the separate drawer carrying the sub-combination, and then only after the drawer has been withdrawn from the housing. Of course, the same type of two-step process is required to insert a replacement battery/cell sub-combination into the drawer and to then engage the drawer in the housing. Therefore, there is a continuing need for an even simpler means of replacing the battery and sensor of a gas detection system. Such a solution should allow for detectors of one or more gases, promote efficient detector operation, allow the unit to be easily serviced, clearly show when the battery and sensor is missing and be attractively configured.

BRIEF DESCRIPTION OF THE INVENTION

The present invention is for use with gas detection systems that require a means for the convenient replacement of the battery and/or gas sensor. The invention comprises an enclosure formed by a generally flat first panel connected to a second panel by a sidewall. The enclosure has a generally rectangular opening into which a generally flat and rectangular "key" can be inserted. As used herein, a "battery key" comprises a power source, such as a standard 9 volt battery or one or more conventional AAA or AA size batteries and means for electrically connecting the power source to the electronics of a gas detection system. A "battery/sensor key" comprises the addition of an optical gas sensor to a battery key for the gas to be sensed. For the purposes of this disclosure, the term "key" is used generally to indicate either a battery key or a battery/sensor key as the example dictates.

The rectangular opening in the enclosure has a pivotably mounted door having an outwardly curved flange. The outwardly curved flange bears brightly colored indicia and serves to warn persons in the vicinity of the absence of the key being insertably mounted within the housing.

Upon full insertion of the key into the housing, an electrical connection between the power source (contained within the key) and the remainder of the gas detection system (mounted within the housing) is made. If the key is a battery/sensor key, the optical sensor(s) for target gas(es) contained therein are optically aligned between a light emitting means and a light detecting means so as to provide detection of the target gas if exposure occurs.

Replacement of a key is easily accomplished by pressing an external ejection button which causes the key to partially but substantially eject from the surrounding enclosure or housing. The user then simply grips and slides the old key out of the enclosure to thereby remove it. A new replacement key is inserted into the enclosure or housing in a manner similar to inserting a floppy disk into a personal computer, that is to say by sliding the replacement key into the rectangular opening and pressing lightly to engage a locking mechanism which operates to secure the key in place.

The second embodiment of the present invention is directed to an enclosure for a combination target gas-smoke detector in which the presence of a hazardous target gas, such as carbon monoxide and/or the presence of smoke can be detected. An optical target gas sensor is used to determine the presence of the target hazardous gas. The presence of smoke is determined by the reflection of light by smoke particles.

The advantage of replacing the battery or battery/sensor combination without having to remove a drawer or remove the enclosure or housing from a wall or ceiling is a clear improvement over the present state of the art. This new invention allows one to effect such a replacement using only one hand thereby leaving the other hand free for safety purposes, e.g. to hold onto a ladder or to brace oneself on a nearby wall.

DETAILED DESCRIPTION

Figure 1:
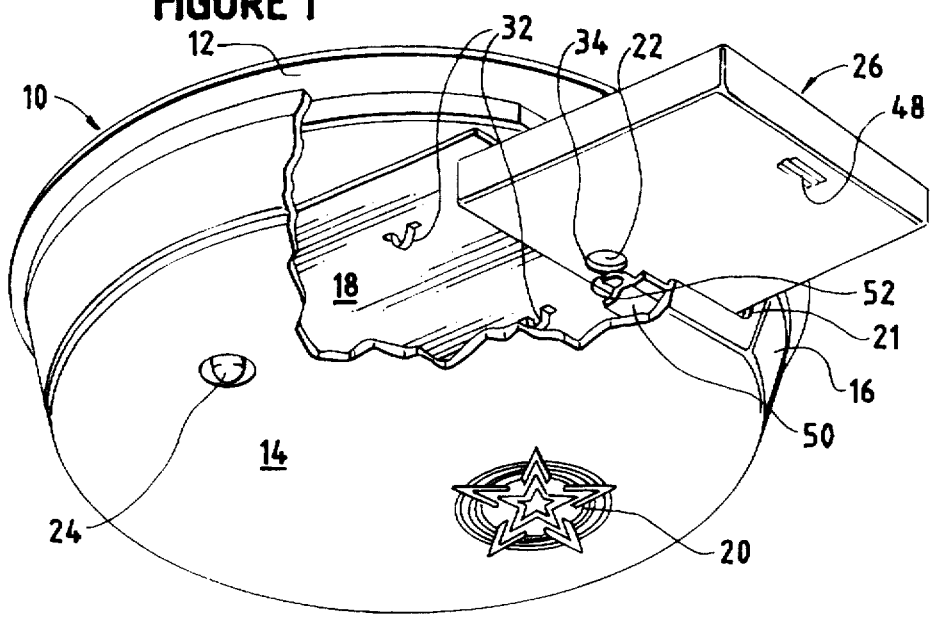
FIG. 1 is a partially cut away, perspective view drawing showing the first embodiment of the present invention.
Figure 2:
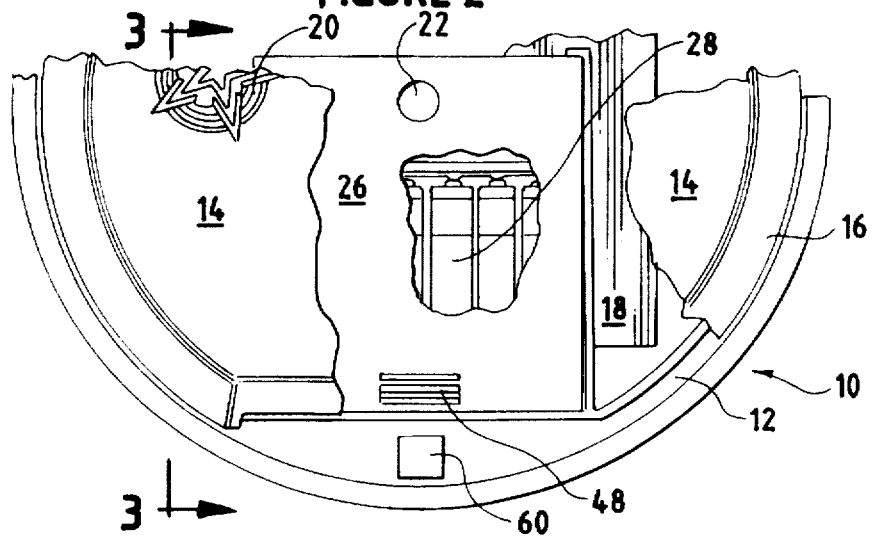
FIG. 2 is a partially cut away, top view drawing showing the first embodiment of the present invention.
Figure 3:
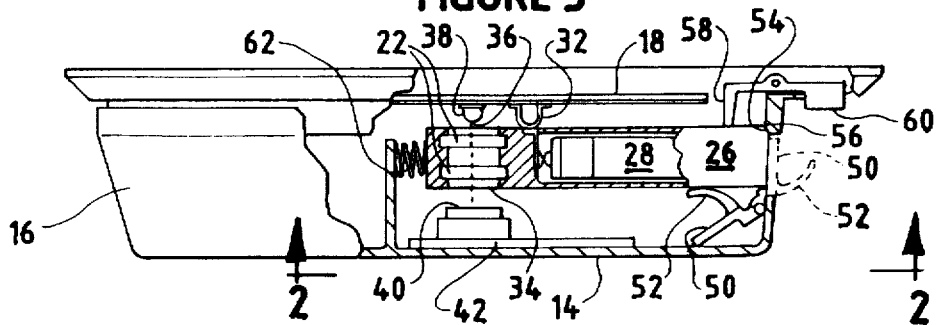
FIG. 3 is a cross sectional drawing showing the enclosure of the present invention taken about 3—3 of FIG. 2.

As seen in FIGS. 1, 2 and 3, the first embodiment of the present invention comprises an enclosure 10 formed by a generally flat first panel 12 and a second panel 14 spaced apart from the first panel 12 by a sidewall 16. The space in the enclosure is sized to house the circuit board and other components of a gas or smoke detection system 18. A large variety of configurations for the enclosure are possible including, square, rectangle, round, round with one flat edge, etc.

The detection system shown in FIG. 1 may be a simple smoke alarm with a conventional battery to be replaced, or it may be an optically based target gas(es) detection system, or it may be a more complex detection system that detects both smoke and target gas(es). In all cases the device responds to the presence of smoke and/or one or more target gases by the triggering of an alarm system within the detection system which may sound an audible alarm, such as a buzzer, beeper or other sound making means, or other suitable safety responses, such as activating a safety shutoff valve or a combination of the audible alarm and activation responses.

For the purposes of the following exemplary embodiment, a target gas detection system that requires a combination battery/sensor key is disclosed. The illustrated example could be adapted for use with a smoke detection system or a combination target gas(es)/smoke detection system.

As shown in FIG. 1, a plurality of slots 20 are provided in the enclosure to allow ambient air to freely flow into the enclosure, thus reaching the target gas sensor 22 contained in a battery/sensor key 26. The slots also serve as a means for allowing any sound generated by an internal audible alarm to escape the enclosure.

On the exterior of the enclosure at least one light emitting means 24, such as a light emitting diode (LED), is provided to indicate the presence of any target gas(es) or smoke. Typically the LED is brightly colored so as to catch the eye when activated by the electronics of the gas detection system.

A generally rectangular opening 21 is provided in the sidewall 16 of enclosure 10 and is configured to accept the battery/sensor key 26, which itself has a generally and correspondingly flat rectangular configuration. Within the opening is a pivotably mounted door, which is described in greater detail hereinbelow.

Figure 4:
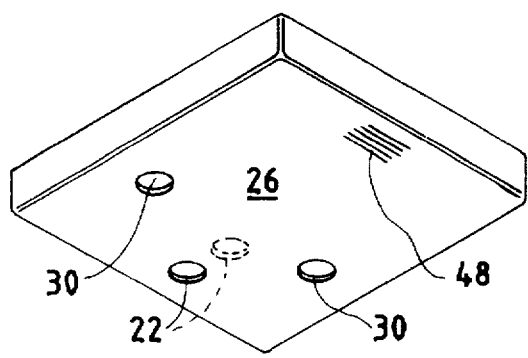
FIG. 4 is a perspective view drawing showing the inverted top side (with respect to FIG. 3) of the battery/sensor key of the present invention.

The battery/sensor key 26 comprises a power source 28, such as integrally housed one or more conventional AAA or AA batteries as shown in FIGS. 2 and 3, electrically connected to contact pads 30 on the "inverted side" of the battery/sensor key (shown in FIG. 4). Electrical contact between the power source 28 within the battery/sensor key 26 and contact means 32 on the electronics circuit board of the target gas detection system 18 is made upon the full insertion of the key into the enclosure via contact pads 30.

The battery/sensor key further comprises at least one target gas sensor 22 contained within a window 34 in the battery/sensor key. As shown in FIG. 3, light 36 from a light emitting means 38, such as an LED mounted on the gas detection system circuit board 18, passes through the window in the battery/sensor key and through the sensor 22 contained therein. The attenuated light is then detected by light detecting means 40, such as a photodiode, mounted on a daughter board 42 that is affixed to the second panel 14 of the enclosure. The daughter board is an integrated part of the gas detection system and is in electrical contact (not shown) with the electronic components of the gas detection system.

Figure 5:
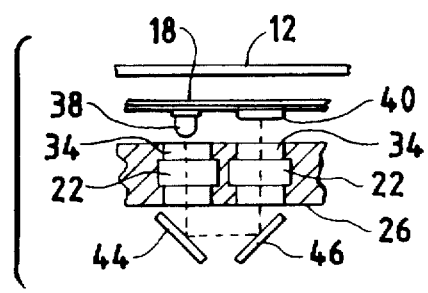
FIG. 5 is a cross sectional view drawing showing the optical alignment of two gas detector sensors with a light emitting means and a light detecting means within the enclosure of the present invention.

As shown in FIGS. 4 and 5, a plurality of target gas sensors 22, 23 and windows 34, 35 may be provided thereby allowing the gas detection system to detect multiple target gases (second sensor shown in dotted line in FIG. 4). In the particular embodiment of the battery/sensor key shown in FIG. 5, light from the light emitting means 38 on the gas detection system circuit board 18 passes through a window 34 containing the first sensor 22. The singly attenuated light is reflected in turn by reflecting means 44 and 46, respectively, and is redirected through the second window 35 containing the second sensor 23. The doubly attenuated light is then detected by light detecting means 40, such as a photodiode, on the gas detection system,'s circuit board 18. In this manner, the sensors 22 and 23 may detect different toxic gases or, for example, may detect different ranges of the same toxic gas.

Figure 6:
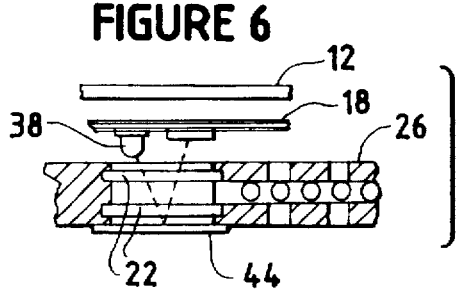
FIG. 6 is a cross sectional view drawing showing an alternative embodiment of FIG. 6.

A variation of this embodiment of the battery/sensor key, is shown in FIG. 6 in which a single reflecting means 44A is part of a battery/sensor key 26A along with one sensor 22A.

As an aid in the handling and gripping of the battery/sensor key during replacement, portions of the outermost distal end of the battery/sensor key contain grips 48 as shown in FIGS. 1,2 and 4. Typically the grips are in the form of small ridges or grooves provided on the surfaces of the battery/sensor key.

As presently contemplated, the generally rectangular opening 21 in the enclosure has a pivotably mounted enclosure door 50 with an outwardly curved flange 52 which serves several functions (shown in FIGS. 1 and 3). When the battery/sensor key is not inserted in the enclosure, the outwardly curved flange 52 or flag is clearly and prominently visible. The surface of the flange 52 is brightly colored or bears brightly colored indicia, warning people in the vicinity that system is not powered. Upon insertion of the battery/sensor key 26 into the opening 21 (FIG. 1) the flange 52 has been designed to engage the leading end 27 of the battery/sensor key and thereby pivot the enclosure generally designated door 50 into the enclosure 10. Upon full insertion of the battery/sensor key 26 (shown in FIGS. 2 and 3), the flange 52 on the enclosure door 50 remains in contact with the surface 29 of the key 26 by means of a spring (not shown) and thereby helps prevent dust or bugs from entering the enclosure 10.

Upon the full insertion of the battery/sensor key 26 into the enclosure 10, several simultaneous events occur as shown in FIG. 3. The trailing edge 54 of the key 26 has been designed to engage a locking lip 56 along the edge of the rectangular opening 21. The flange 52 (in contact with the lower surface 29 of the key 26 in FIG. 3) may be designed to flexibly bias the key 26 into a locked disposition behind lip 56. Simultaneously, the upright 58 of a pivotably mounted ejection means generally designated 59 is depressed by the surface 61 of the battery/sensor key 26. An ejection button 60 on the other end of the ejection means 59 is thereby forced to extend above the surrounding surface or rim 61 of the enclosure 10. Upon pressing the ejection button 60 in an upwardly or counterclockwise direction as illustrated, the upright 58 moves the battery/sensor key 26 in such a manner that the trailing edge 54 of the battery/sensor key 26 disengages from behind the locking lip 56 along the edge of the rectangular opening 21. This combination of actions provides for selective engagement and disengagement/ejection of the key from the enclosure 10. Compression means 62, such as a spring, assists not only in the trailing edge 54 engaging the locking lip 56, but also in the substantial, partial ejection of the key 26 out of the enclosure 10 upon release of the key 26 effected by the ejection means 59. Substantial, partial ejection of the key 26 indicates to a user that the system is not operable. Further, separate alarms may be provided to detect low power level or sensors in need of replacement. Typically, the battery source will require replacement of the key before the sensor (s). However, substantial exposure to the gases being sensed could result in the expended sensor requiring replacement of the key before the battery.

Upon full insertion of the battery/sensor key (as shown in FIG. 3), contact means 32 on the circuit board 18 of the gas detection system come into electrical contact with the contact pads 30 on the surface of the key 26. This action provides electrical power from the key's power source 28 to the electronic components of the gas detector system.

Lastly, upon full insertion of the battery/sensor key, the optical sensors 22 contained within the windows of the key are brought into optical alignment with the light emitting means 38 and the light detecting means 40 of the gas detection system. This allows the gas detection system to monitor the optical characteristics of the sensor disk and thus detect the presence of target gas(es).

Given the above disclosure, one skilled in the art would recognize that the replacement of an integral power source and gas sensor has been greatly simplified. Replacement of the battery and/or battery/sensor key is a relatively easy process which does not require special skills or tools. Removal of the battery sensor key is accomplished by pushing the ejection button 60, which causes the battery/sensor key to release from behind lip 56 and to partially and substantially eject from the enclosure. The key is removed from the enclosure by simply gripping the protruding portion and pulling the remainder of the key out. Upon removal of the battery/sensor key, the enclosure door closes, prominently displaying the outwardly curved flange. This latter feature serves to warn persons within sight of the gas detection unit that the unit has been deactivated by virtue of no key being in place. Additional warning devices could be included within the system to warn users that a charged battery is not inserted or not fully inserted. Such devices (e.g., buzzers, blinking lights and the like) are well known. A replacement key is simply inserted into the generally rectangular opening of the enclosure in a manner similar to inserting a magnetic storage disk into a personal computer. Therefore only a slight, inward pushing force is needed to fully engage the battery/sensor key as the spring means 62 that helps to eject the key 26 is being compressed and the trailing edge of the key is engaging the locking lip of the enclosure opening. The total amount of force required to insert a replacement key is very slight and therefore even the most feeble person can successfully insert the battery/sensor key with one hand.

Figure 7:
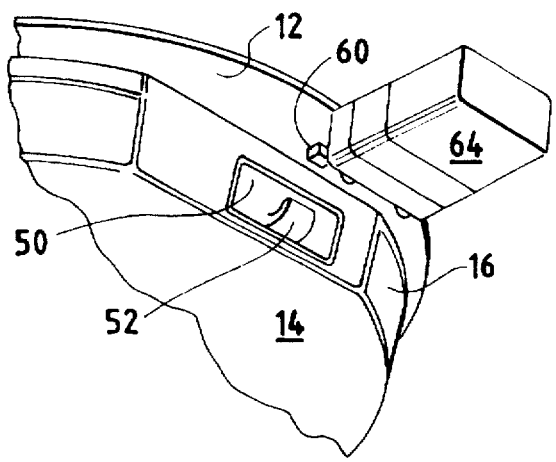
FIG. 7 is a partial perspective view drawing of another embodiment of the present invention.
Figure 8:
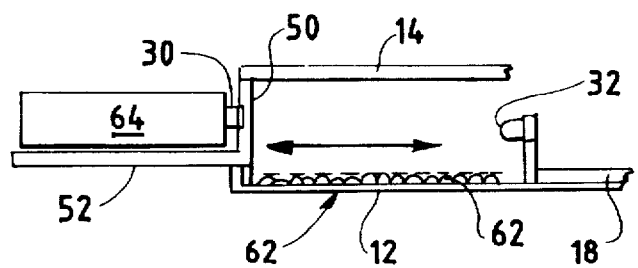
FIG. 8 is a side view of the key of the embodiment.

An alternative embodiment of the smoke or gas detector enclosure is shown in FIG. 7 in which the key 26B is just a battery 64 as encountered for example in a smoke detector. As shown in this alternative embodiment, the battery 64 may be a commonly available conventional 9 volt battery. The mechanisms of this unit are analogous to the components and interaction of components described above. Another embodiment is shown in FIG. 8 in which a slidable flag 52c appears when the battery is removed. Flag 52c is biased outwardly by compression spring 62c. When battery 64 is pushed inwardly so that contacts 30c and 32c mate, spring 62c is compressed and flag 52c is held within the housing by abutment of battery 64 against the upward lip 67 on the leading edge of flag 52c.

Figure 9:
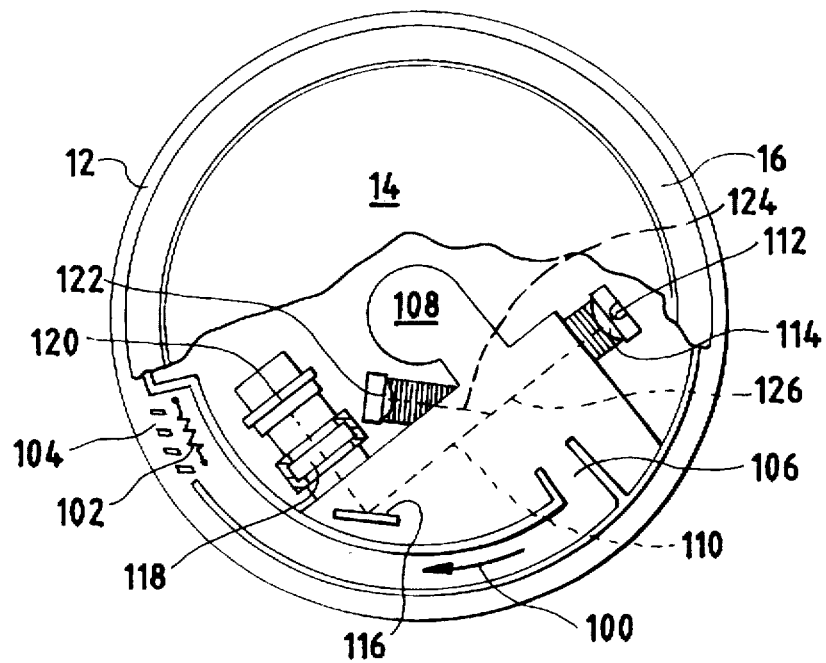
FIG. 9 is a partially cut away, top view drawing of a further embodiment of the present invention.

A further embodiment of the present invention is shown in FIG. 9 in which either or both smoke and a target gas can be detected. Following is a description of the operation of this embodiment shown.

A convective flow (as represented by arrow 100) can be created by heating air adjacent to a heating element 102, such as a drop resistor, next to the exit 104 of a chimney-like passage 106. This creates a convective flow within the enclosure and smoke or gas is drawn into the enclosure 107 via entrance 108. Diffusion of gas and smoke within the enclosure 107 allows for their detection by two different means as described below.

At least one target gas is detected by optical means using a beam of light 110 generated by light emitting means 112, such as a light emitting diode. The beam of light is directed across the detection chamber by lens 114 and is reflected by reflective means 116 through an optical gas sensitive sensor 118 of the sort previously described. The attenuated light is then detected by light detecting means 120, such as a photodiode which is part of the gas detection system. Changes in the optical characteristics of the sensor 118 caused by the presence of the target gas are thus detected and if a hazardous condition exists a response is made by the system such as an alarm being sounded or other suitable response action, such as the closing of a safety shutoff valve.

The presence of smoke within the enclosure 107, and thus in the outside ambient air, is determined by reflection of light by smoke particles. As the beam of light 110 generated by the light emitting means 112 and lens 114 crosses the interior of the enclosure, the presence or absence of smoke is determined by photodiode 122 based on the amount of light reflected 124 by any smoke particles 126 that may or may not be present. In the absence of smoke, very little if any reflected light 124 will be reflected into photodiode 122. However when smoke is present, a finite amount of the light beam 110 will be reflected by the smoke particles 126 and thus detected by photodiode 122. The reflected light 124 detected by the photodiode 122 is used to trigger an alarm for smoke that may be distinctive from the alarm for target gas. No sensor needs to be used or replaced in this detection mode. Hence the battery only key of FIG. 7.

The present invention has been described in relation to limited examples which are for illustrative purposes and are not intended to limit the scope of the invention. Although a number of specific embodiments and compositions have been described and illustrated herein, it will be apparent to those skilled in the art that further variations are possible. Thus, the present invention may be practiced otherwise than specifically described, and therefore is defined by the following claims.

What is claimed is:

1. A detection apparatus comprising:

a first panel and a second panel spaced therefrom, said panels being of generally flat configuration;

a sidewall being connected to and extending between said panels, the arrangement being such that said panels and said sidewall cooperate together to define therebetween an enclosure;

said enclosure having an opening therein, said opening being of generally rectangular configuration;

a door disposed adjacent to said opening, said door pivoting relative to said opening for selectively closing said opening;

a detection system disposed within said enclosure;

said detection system including:

electronic components housed within said enclosure;

a key having a generally rectangular configuration for the slidable insertion thereof within said enclosure through said rectangular opening;

said key including:

a power source; and at least one pair of electrical contacts electrically connected to said power source, the arrangement being such that when said key is fully inserted into said enclosure, said at least one pair of contacts are electrically connected to said electronic components.

2. A detection apparatus as set forth in claim 1 wherein said door further includes:

an outwardly curved flange extending from said door, the arrangement being such that said flange is prominently displayed when said key has not been inserted into said enclosure.

3. A detection apparatus as set forth in claim 2 wherein said door is spring biased to close said opening when said key is removed from said enclosure, the arrangement being such that upon removal of said key, said flange extending from said door pivots outwardly through said opening in order to visibly display the absence of said key.

4. A detection apparatus as set forth in claim 1 further including:

ejector means for partially ejecting said key from said enclosure.

5. A detection apparatus as set forth in claim 4 wherein said ejector means for partially ejecting said key from said enclosure includes:

an ejection means having a first and a second end, said ejection means being pivotally secured between said ends thereof to said first panel adjacent to said opening;

an upright extending from said first end of said ejection means, said upright engaging said key on insertion of said key through said opening;

an ejection button extending from said second end of said ejection means;

a flange extending from said door for biasing said key towards said upright when said key is inserted through said opening;

compression means disposed within said enclosure for urging said key outwardly through said opening;

a locking lip partially defining said opening for engaging said key when said key is fully inserted into said enclosure, said locking lip, compression means, flange and upright interacting to secure said key within said enclosure with said contacts providing an electrical connection between said power source and said electronic components, the arrangement being such that when said ejection button is depressed, said ejection means pivots and said upright urges said key towards said flange so that said key becomes disengaged from said locking lip permitting said compression means to partially eject said key through said opening.

6. A detection apparatus as set forth in claim 1 wherein said detection system includes:

a smoke detection system.

7. A detection apparatus as set forth in claim 1 wherein said detection system includes:

an optically based target gas detection system.

8. A detection apparatus as set forth in claim 1 wherein said detection system includes:

a combination smoke and an optically based target gas detection system.

9. A detection apparatus as set forth in claim 1 wherein said key further includes:

an outer surface defining a window;

at least one optical target gas sensor disposed within said key, said sensor being optically connected to said window.

10. A method of replacing a key which is a combination of a battery and a sensor of a target gas detection apparatus, said method comprising the steps of:

partially ejecting a key from an enclosure defined by a first and second panel and a sidewall connecting and extending between the panels, the step of partially ejecting being accomplished with the aid of an ejection system;

manually gripping one end of the key;

slidably removing the key from the enclosure;

manually gripping an end of a replacement key which includes a combination of a battery and gas sensor;

slidably inserting the replacement key into the enclosure; and locking the replacement key within the enclosure such that the key is engaged within the enclosure and the battery is electrically connected to the detection system.

11. An enclosure for a detection system comprising:

a generally flat first panel connected to a second panel by a sidewall thereby forming the enclosure;

a generally rectangular opening in said enclosure in which a door is pivotally mounted;

a generally rectangular key configured to be inserted into said generally rectangular opening comprising a power source and at least one pair of electrical pads on the surface of said key wherein upon full insertion of said key into the enclosure, said electrical pads come into electrical connection with corresponding contacts of the detection system.

12. An enclosure as recited in claim 11 wherein the pivotally mounted door further comprises an outwardly curved flange which is prominently displayed when said key is removed from the enclosure.

13. An enclosure as recited in claim 12 wherein the detection system is a smoke detection system.

14. An enclosure as recited in claim 12 wherein the detection system is an optically based target gas detection system.

15. An enclosure as recited in claim 12 wherein the detection system is a combination of a smoke detection system and an optically based target gas detection system.

16. An enclosure as recited in claim 14 wherein the key further comprises at least one window in the surface of said key and at least one optical, target gas sensor contained within said window.

17. An enclosure as recited in claim 15 wherein the key further comprises at least one window in the surface of said key and at least one optical, target gas sensor contained within said window.

18. A key for use in a gas detection system including electronic components, the key comprising:

a power source;

means for electronically connecting said power source to the electronic components of the gas detection system; and ejector means for disengaging the key from the gas detection system.

19. A generally rectangular key as recited in claim 18 further comprising at least one window in the surface of said key and at least one optical target gas sensor contained within said window.

20. An enclosure as recited in claim 16 wherein the target gas is carbon monoxide and the target gas sensor comprises of a semi-transparent substrate impregnated with a chemical reagent that upon exposure to carbon monoxide changes the optical density of the semi-transparent substrate.

21. An enclosure as recited in claim 17 wherein the target gas is carbon monoxide and the target gas sensor comprises of a semi-transparent substrate impregnated with a chemical reagent that upon exposure to carbon monoxide changes the optical density of the semi-transparent substrate.

22. A generally rectangular key as recited in claim 19 wherein the target gas is carbon monoxide and the target gas sensor comprising a semi-transparent substrate impregnated with a chemical reagent which upon exposure to carbon monoxide changes the optical density of the target gas sensor.

23. A key for use in a gas detection system including electronic components, the key comprising:

a power source;

means for electronically connecting said power source to the electronic components of the gas detection system;

at least one window in the surface of said key;

at least one optical carbon monoxide sensor contained within said window; said sensor comprising a semi-transparent substrate impregnated with a chemical reagent which upon exposure to carbon monoxide changes the optical density of the sensor; and a reflecting means within said window such that a light passing through the target gas sensor once, is reflected back through the target gas sensor a second time, thereby multiply attenuating the light.

* * * * *